ELECTRONIC STORAGE AND SWITCHING CIRCUITS

Filed Dec. 18, 1956 5 Sheets-Sheet 1

Inventors
Gerald H. Perry
Eric W. Shallow
George R. Hoffman
By: Stevens, Davis, Miller & Mosher, Attorneys

ELECTRONIC STORAGE AND SWITCHING CIRCUITS

Filed Dec. 18, 1956 5 Sheets-Sheet 2

Gerald H. Perry, Eric W. Shallow, George R. Hoffman
Inventors
By
Stevens, Davis, Miller & Mosher,
Attorneys

ELECTRONIC STORAGE AND SWITCHING CIRCUITS

Filed Dec. 18, 1956 5 Sheets-Sheet 3

Gerald H. Perry, Eric W. Shallow, George R. Hoffman
Inventors
By
Stevens, Davis, Miller & Mosher,
Attorneys Oct. 16, 1962 G. H. PERRY ETAL 3,059,225

ELECTRONIC STORAGE AND SWITCHING CIRCUITS

Filed Dec. 18, 1956 5 Sheets-Sheet 4

Inventors
Gerald H. Perry
Eric W. Shallow
George R. Hoffman
By: Stevens, Davis, Miller & Mosher, Attorneys

ELECTRONIC STORAGE AND SWITCHING CIRCUITS

Filed Dec. 18, 1956 5 Sheets-Sheet 5

Inventors
Gerald H. Perry
Eric W. Shallow
George R. Hoffman
By: Stevens, Davis, Miller & Mosher, Attorneys United States Patent Office 3,059,225

Patented Oct. 16, 1962

3,059,225

ELECTRONIC STORAGE AND SWITCHING CIRCUITS

Gerald Horace Perry and Eric William Shallow, Malvern, and George Richard Hoffman, Sale, England, assignors, by mesne assignments, to International Business Machines Corporation, New York, N.Y., a corporation of New York Filed Dec. 18, 1956, Ser. No. 629,174
Claims priority, application Great Britain Dec. 19, 1955
7 Claims. (Cl. 340—174)

Figure 1:
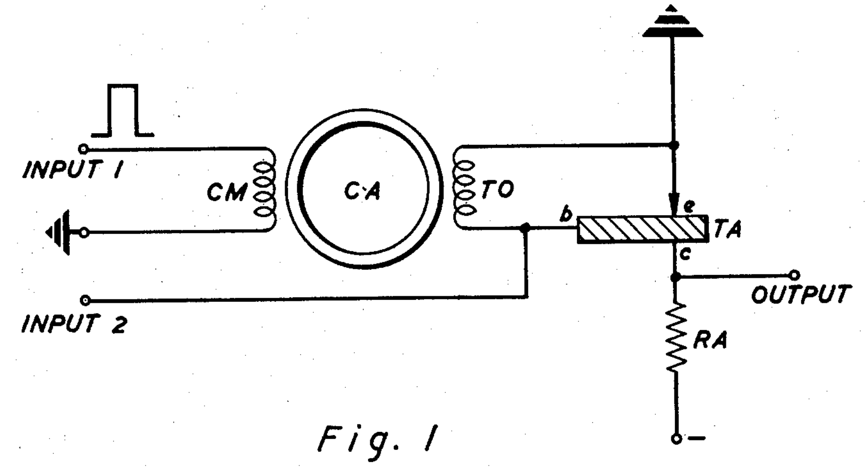

This invention relates to electronic storage and switching circuits.

The invention is concerned with electronic storage and switching circuits of the kind in which a magnetic circuit is provided having a magnetic characteristic of the type generally called a rectangular hysteresis-loop characteristic; such a magnetic circuit possesses two clearly defined states of remanent magnetisation flux which are distinguishable by the direction of the flux; the direction of the flux is determined by the direction of the magnetising field which produced it. The circuit is changed from one state to the other by applying a magnetising field of a suitable level and of a direction opposite to that of the field which established the existing state; the application of a magnetising field having the same direction as that of the establishing field has negligible effect.

A typical magnetic circuit is in the form of a ring core made from ferrite or other magnetic material which possesses the desired rectangular hysteresis loop characteristics; the magnetising field can then be applied by means of coils wound on the ring core. For a given sense of the magnetising field (dependent upon the direction of winding of the coil and of the current flow in it) the core will change its magnetisation from one given state to another; to reverse the change the magnetising field must be applied in the opposite sense.

For convenience in the fields of activity in which such cores are used the two states are commonly designated "1" and "0" following conventional binary notation. Similarly a coil which, for a given direction of current will establish, or alternately not disturb, a "1" state in a core, can be designated a "1" coil; a "0" coil follows naturally as a coil arranged to magnetise the core in the opposite direction and which will establish, or will not disturb, a "0" state.

A core can usefully store information in a binary manner ("1" or "0," plus or minus, on or off, and so forth) and means can be provided for changing the state of the core and for interrogating the core to determine its state at a given time.

A simple basic storage and switching circuit of the kind referred to comprises a magnetic circuit having a so-called rectangular hysteresis-loop characteristic, at least one coil linking the magnetic circuit, a semiconductor switching device having an emitter, a collector and a base electrode, one coil and the switching device being connected so that a signal current flows in its collector circuit whenever the magnetisation of the magnetic circuit is changed in one sense.

An input signal can be applied to the circuit to determine the magnetisation state of the magnetic circuit and can be applied by means of a suitable coil, or coils, linking with the magnetic circuit, or, simply, by a suitable connection to the circuit of the coil connected with the switching device.

Conveniently the one coil and the switching device are connected with two terminals of the coil connected across the emitter and base of the device. Where the device is an "N" type transistor the emitter is connected positively relative to the collector; an output load resistor is connected in the emitter-collector circuit. In the absence in the coil of a pulse due to a change of direction of the remanent flux in the magnetic circuit the coil effectively shorts the transistor emitter-base circuit and negligible current flows in the transistor, i.e. it is turned-off, but when a pulse appears in the coil due to a change of direction of the flux in one given sense the base is biassed negatively relative to the emitter; current then flows between the emitter and the collector and an output pulse signal appears across the emitter-collector load resistor. A pulse in the coil due to a change of direction of the flux in the opposite sense to the given sense merely biases the base more positively relative to the emitter and there is no increase of current in the emitter-collector circuit.

Feedback means can advantageously be provided to feed back the signal current or part of it to produce flux in the magnetic circuit to assist the change of flux producing it (i.e. the flux due to the input pulse). Such means are typically a coil linking with the magnetic circuit and connected in an appropriate sense in the collector circuit of the switching device.

The effect of such feedback is that the signal current caused to flow in the collector circuit assists the already-initiated change of flux in the magnetic circuit; thus a pulse of less amplitude and/or duration may be used to change the state of the core.

It has already been proposed to use the basic circuit as the fundamental element of a binary counter (A Transistor-Magnetic Core Circuit, by S. S. Guterman and W. M. Carey Jr., I.R.E. Convention Record No. 4, March 1955); a feedback arrangement is there envisaged in which the output of one and the same basic circuit is fed back into the circuit to provide for the conditional operation of the circuit as between its response to successive input signals; this conditional operation giving the binary characteristic to the counter.

There are, however, disadvantages in such an arrangement, for instance in the case where the input is a train of pulses, an output signal whilst being propagated in the feedback path, from the output to an input, will be affected differently according to its recurrence frequency; hence the frequency at which such a counter can operate will be limited due to frequency dependence of the feedback path.

It is accordingly an object of the invention to provide an improved binary counter made up of basic storage and switching circuits of the kind referred to.

According to the invention there is provided the combination of first and second storage and switching circuits each comprising a magnetic circuit having a rectangular hysteresis-loop characteristic, at least one coil linking the magnetic circuit, and a semiconductor switching device having an emitter, a collector and a base electrode, one coil and the switching device being connected so that a signal current flows in its collector circuit whenever magnetisation of the magnetic circuit is changed in one sense, wherein a common input circuit couples input signals to both the magnetic circuits, a first coupling means couples the collector circuit of the first storage and switching circuit with the magnetic circuit of the second storage and switching circuit, and a second coupling means couples the collector circuit of the second storage and switching circuit with the magnetic circuit of the first storage and switching circuit, whereby in operation in response to a common input signal the magnetisation of one magnetic circuit is related in a predetermined manner to the magnetisation of the other.

According to the invention in one aspect a binary counter comprises first and second storage and switching circuits each comprising a magnetic circuit having a rectangular hysteresis-loop characteristic, at least one coil linking the magnetic circuit, and a semiconductor switching device having an emitter, a collector and a base electrode, one coil and the switching device being connected so that a signal current flows in its collector circuit whenever magnetisation of the magnetic circuit is changed in one sense, wherein each circuit is connected to common input means and so cross-connected with the other that the switching device of each circuit can energise the magnetic circuit of the other whereby operation of one magnetic circuit to change its magnetisation in response to an input signal is related in a predetermined manner to the operation of the other.

According to the invention in another aspect a binary counter comprises first and second storage and switching circuits each comprising a magnetic circuit having a rectangular hysteresis-loop characteristic, two coils coupling to the magnetic circuit, a transistor having its base-emitter circuit connected to the first coil, and its collector circuit connected to the second coil of the other storage and switching circuit, the arrangement being such that a signal current flows in the collector circuit whenever magnetisation of the magnetic circuit is changed in one sense, and a common input circuit by means of which an input signal can effect energisation of each magnetic circuit in the opposite sense to that effected by the second coil associated with that circuit, whereby with the magnetic circuits initially magnetised in opposite senses the application of a recurrent pulse input signal to the input circuit causes the magnetic circuits cyclically to reverse their state and then restore to their initial state at a rate equal to half the recurrence rate of the input signal.

According to the invention in a further aspect a binary counter comprises first and second storage and switching circuits each comprising a magnetic circuit having a rectangular hysteresis-loop characteristic, two coils coupling to the magnetic circuit, and a transistor having its base-emitter circuit connected to the first coil, its collector circuit being connected to the second coil of the other storage and switching circuit, the arrangement being such that a signal current flows in the collector circuit whenever magnetisation of the magnetic circuit is changed in one sense, the second coil of the first magnetic circuit when energised does not effect a change of sense such as to cause signal current to flow, and the second coil of the second magnetic circuit when energised does effect a change of sense such as to cause signal current to flow, a common input circuit by means of which an input signal can effect energisation of each magnetic circuit in the opposite sense to that effected by the second coil associated with the magnetic circuit, and further energising means for energising the second magnetic circuit, whereby with the application of a recurrent pulse input signal to the input circuit and a pulse signal, whose pulses are interlaced with those of the input signal, applied to the further means, the magnetic circuits cyclically reverse their state and then restore to their initial state at a rate equal to half the recurrence rate of the input signal.

A shift register can be provided by connecting in cascade a plurality of binary counters according to the invention.

Figure 3:
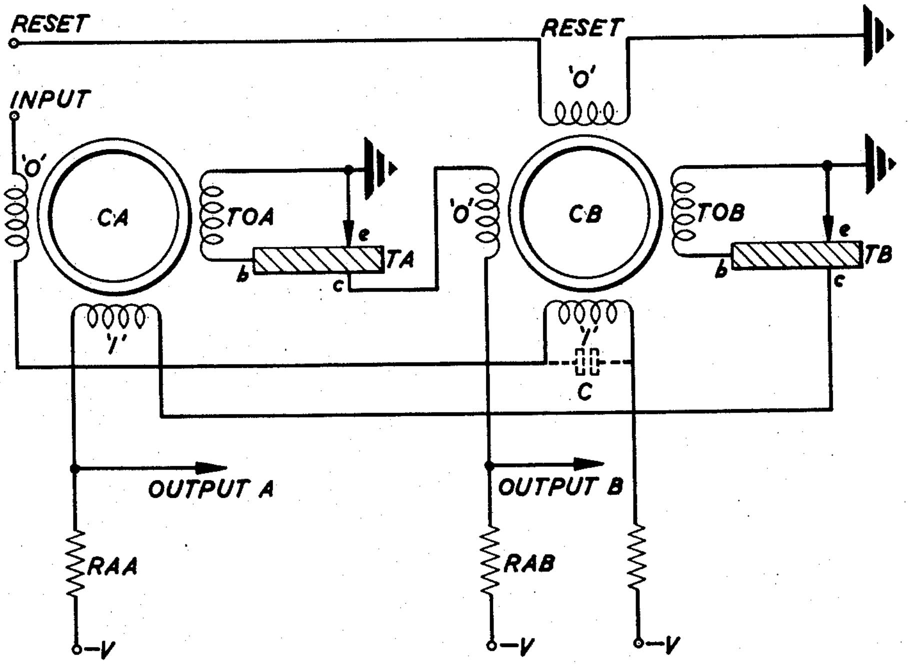
Figure 2A:
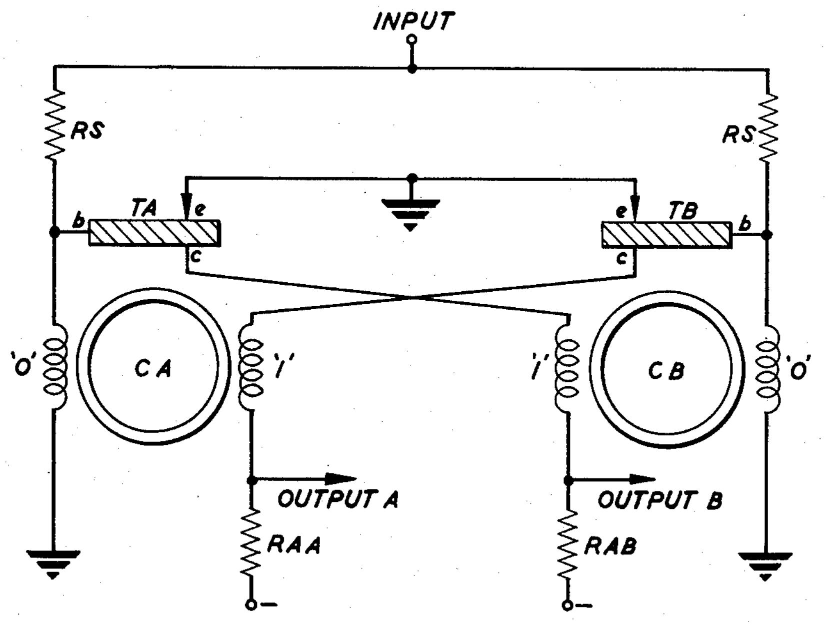
Figure 2B:
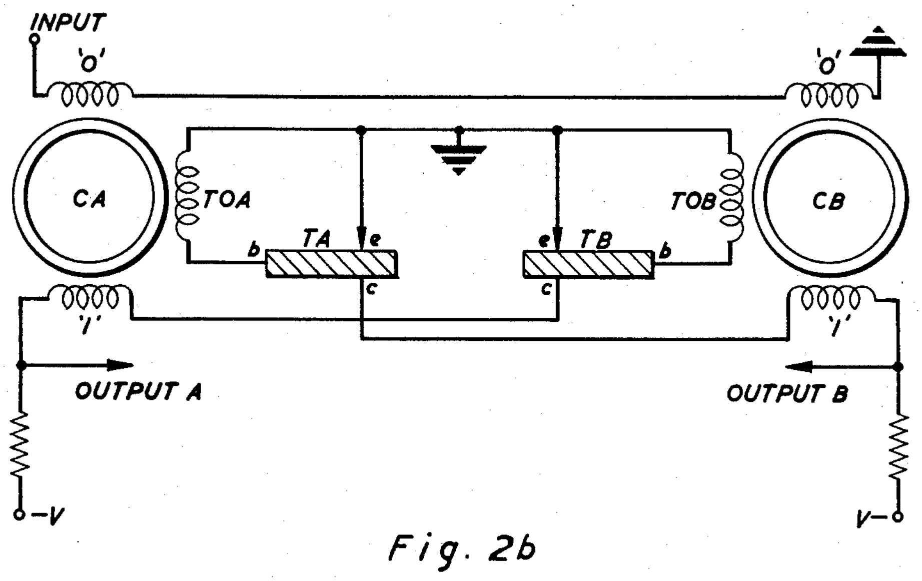
Figure 4:
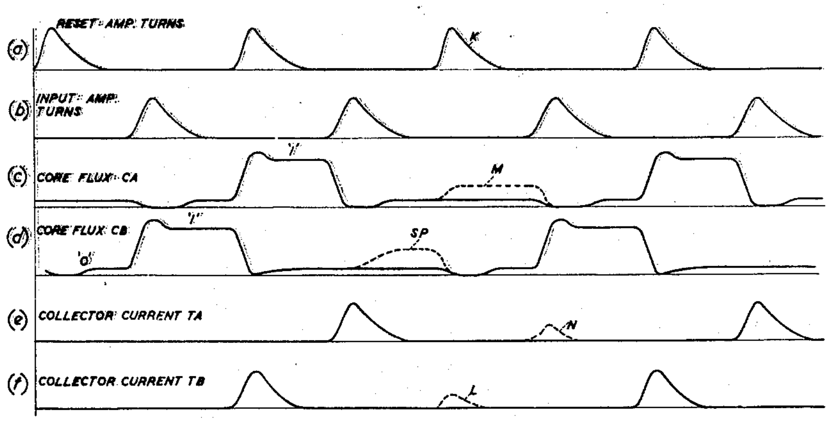
Figure 7:
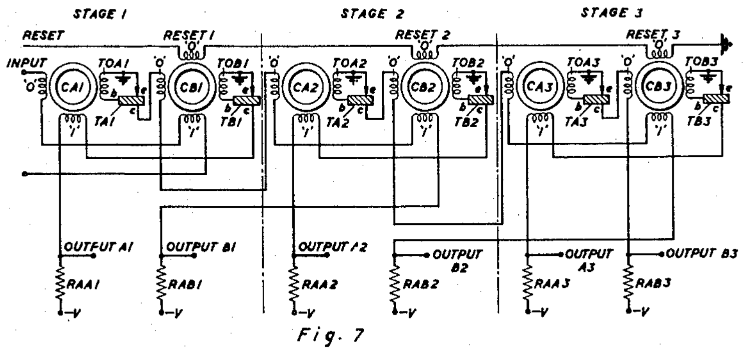
Figure 6:
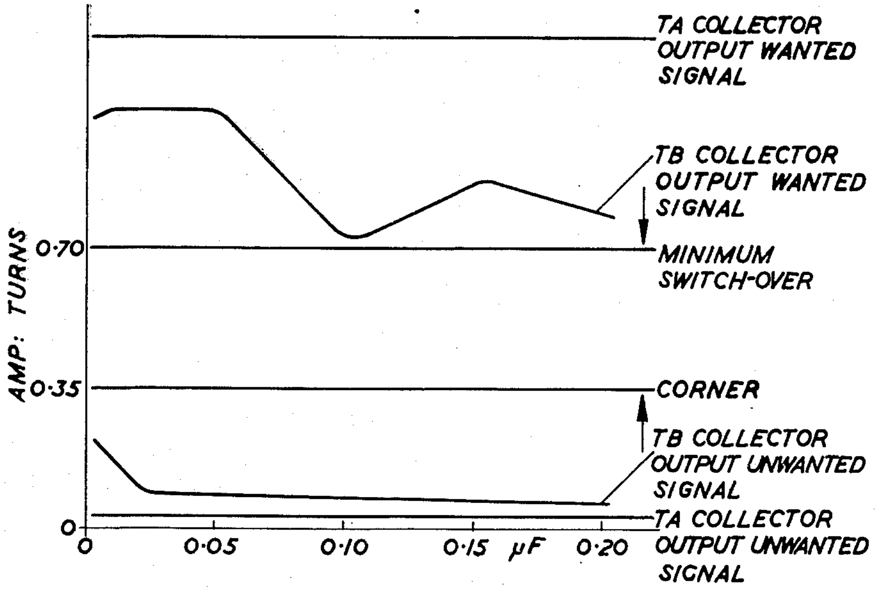
Figure 5:
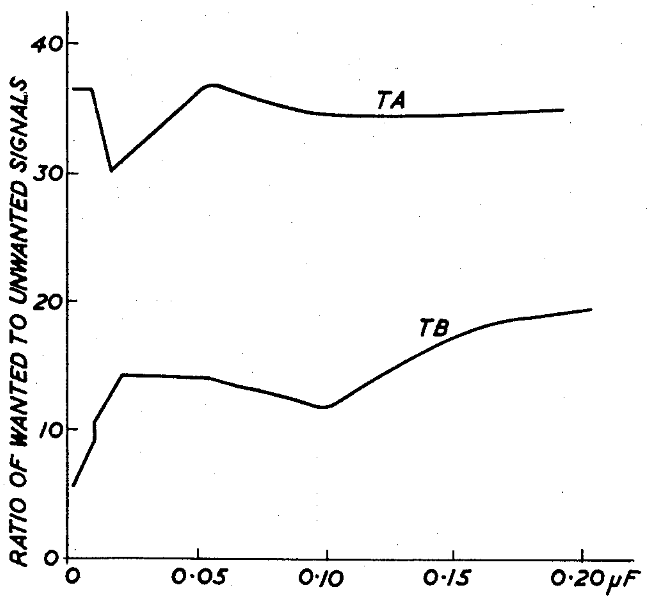
Figure 8:
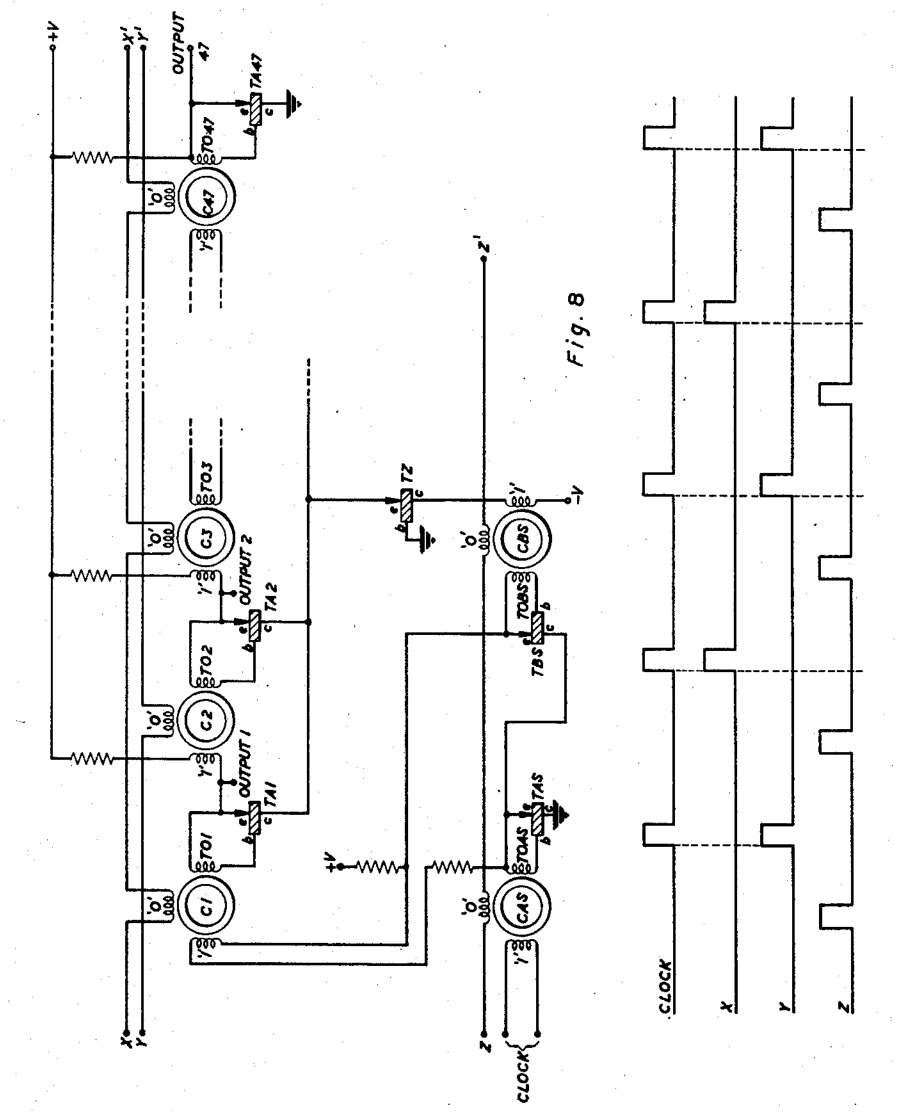

In order to make the invention clearer several embodiments will now be described with reference to the accompanying drawings, in which:

FIG. 1 shows a basic storage and switching circuit using a rectangular hysteresis-loop magnetic ring core, FIG. 2(*a*) and (*b*) show symmetrical binary counters based on the circuit of FIG. 1 for voltage and current inputs respectively, FIG. 3 shows an asymmetrical binary counter based on the circuit of FIG. 1, FIG. 4 shows waveforms of the operation of the asymmetric counter of FIG. 3, FIGS. 5 and 6 show certain graphs of use when discussing the reliability of counters based on the storage circuit of FIG. 1, FIG. 7 shows a three-stage counter, and FIG. 8 shows a so-called "P"-pulse generator.

FIG. 1 shows a basic storage circuit in which a core CA consisting of ferrite material exhibiting a rectangular hysteresis loop characteristic is wound with a coil TO. A transistor TA is provided with its emitter and base connected to the ends of the coil TO. The emitter of the transistor TA is connected to earth and the collector is connected via a suitable load resistor RA to a negative source. A coil CM is also wound on the core CA, one end being earthed and the other end connected to a terminal Input 1.

Assume now that the core CA carries a remanent flux arbitrarily designated as of the "1" state then according to the direction of winding of the coil CM and the direction of a current input into the coil CM, the state of the core CA can be changed from the "1" state to a "0" state. The resulting change of flux in the core CA will induce an E.M.F. in the coil TO; also, if the coil TO is wound in such a way that this induced E.M.F. can drive the base of the transistor TA negative relative to the emitter then the transistor TA will be operated, i.e. current will flow in the emitter-collector circuit.

When the change of flux has been completed and following a small interval in time due to hole storage in the transistor TA, the transistor TA will be "turned off" and current will no longer flow in its emitter-collector circuit. The cessation of input current in the coil CM will not affect the magnetic state of the core CA; thus the core CA will be left in the "0" state with the rest of the circuit in its initial condition. It has thus been possible to store a "0" in the core CA and the storage can continue indefinitely with negligible flow of any current in the associated input and transistor circuits.

If a current is fed to the terminal Input 1 in the opposite direction so that the core CA is changed from the "0" state to the "1" state, the resulting flux change in the core CA will again induce an E.M.F. in the coil TO but this time in such a direction that the base of the transistor TA is driven more positive relative to the emitter; in these circumstances the transistor TA is not "turned on" and the circuit is left, again in its initial state, with the core in the "1" state storing a "1."

It will now be appreciated that, when the core CA is changed from a "1" state to a "0" state, the transistor TA is operated and an output pulse appears across the resistor RA at the Output terminal. On the other hand, when the state of the core CA is changed from the "0" state to the "1" state the transistor TA is not operated and there is no output at the Output terminal. Moreover, if the coil CA is in, say, the "1" state and a current is applied to the terminal Input 1 in a direction appropriate to establish a "1" state in the core CA, then there will be no change of flux in the core CA and hence no induced E.M.F. in the coil TO. For convenience these conditions of operation are taken as conventional to avoid consideration of arbitrary details about actual directions of flux in the core and winding senses.

It is thus possible to determine which state, "1" or "0," is stored in the core CA by energising the core in a known direction and noting whether an output is obtained or not. There is thus provided a storage circuit which can store in a static state, that is, without any current flow being necessary and in which the information stored can be changed and interrogated.

In practice it is often convenient to use separate coils in place of the one coil CM for energising the core CA in each of the two directions and to avoid considerations of actual direction of flow of energising current; in which case one coil is conveniently designated a "1" coil and the other coil a "0" coil, appropriately to the relative state (direction) of magnetisation of the core CA which they will be employed to produce.

An alternative way to that described above of energising the core CA is to apply a negative voltage pulse to the terminal Input 2 which drives a current through the coil TO to energise the core CA; the back E.M.F. which is generated in the coil TO, when the core CA is in a different state from that into which the core CA is energised from the terminal Input 2, serves to drive the base of the transistor TA negative relative to its emitter and so operate the transistor TA. The operation of the circuit when energised from the terminal Input 2 is otherwise similar to that when energised from the terminal Input 1.

In some circumstances a feedback arrangement consisting of a second core wound coil in the transistor TA collector circuit improves the reliability of circuits employing the storage circuit described above; where, for instances a pulse is otherwise too short to cause the core to change over the application of feedback can often ensure that the core does change over.

FIG. 2(*a*) shows a counter circuit using two, interconnected, basic elements of the type shown in FIG. 1. The circuit comprises two cores CA and CB each having an associated transistor TA and TB respectively; the collector circuit of each transistor is taken through a coil wound on the core associated with the other transistor. Thus, for the core CA a coil conveniently designated a "0" coil is connected between the base and emitter of the associated transistor TA; similarly a coil wound on the core CB and designated a "0" coil is connected across the base and emitter of the transistor TB. The collector of the transistor TA is connected to a negative source via a load resistor RAB and a coil wound so as to constitute a "1" coil on the core CB; and correspondingly the collector of the transistor TB is connected to a negative source via a load resistor RAA and a "1" coil wound on the core CA.

The input connections of the "0" coils of the core CA and CB are fed from a common Input terminal through resistors RS. Terminals Output A and B are connected to the load resistors RAA and RAB.

To consider the operation of this circuit assume that initially the core CA is in the "1" state and the core CB in the "0" state; a negative pulse applied to the Input terminal will then energise both cores CA and CB by their "0" windings so as to establish the "0" state in both cores. Core CB is already in the "0" state so that no back E.M.F. will be produced across its "0" coil; but the core CA is in the "1" state and the application of the negative input pulse to its "0" coil will change the state of the core CA to the "0" state. The resulting back E.M.F. in the "0" coil of the core CA will drive the base of the transistor TA negatively relative to its emitter with the result that current will flow in the emitter-collector circuit of the transistor TA.

The current pulse appearing in the emitter-collector circuit of the transistor TA energises the "1" coil of the core CB which, being in the "0" state, will then be changed to the "1" state. This current pulse from the transistor TA is, of course, made longer than the input pulse by virtue of hole storage in the transistor TA.

The states of the cores CA and CB have thus been reversed. Because of the symmetrical nature of the circuit a succeeding negative pulse applied to the Input terminal will reverse this state of affairs and the circuit will assume its original condition with the core CA in the "1" state and the core CB in the "0" state. The complete cycle can continue as long as input pulses are applied to the Input terminal. Output pulses which appear at the terminals Output A and B will have a recurrence frequency equal to half that of the input pulses applied to the Input terminal; the pulses at the Outputs A and B will, of course, be interlaced in time.

It will be noted that the circuit of FIG. 2(*a*) is adopted for a voltage input; a corresponding circuit for a current input is shown in FIG. 2(*b*). The current input is applied to the Input terminal and is fed through "0" coils connected in series and associated with the cores CA and CB.

In operation the "0" coils change the state of first one and then the other of the cores CA and CB according to their initial state. If it is assumed, for instance, that the core CA is in the "1" state and the core CB in the "0" state then the first current pulse will change the state of the core CA from the "1" state to the "0" state, the transistor TA will therefore operate and in doing so will energise the "1" coil associated with the core CB and hence change the state of the core CB. The states of the cores CA and CB have now been reversed and the next current pulse will change the state of the core CB from the "1" state to the "0" state; the transistor TB will now operate and energise the "1" coil associated with the core CA the state of which will be changed accordingly. For subsequent current pulses applied to the Input terminal this cycle of operations will be repeated so that, as in the case of the circuit of FIG. 2(*a*) the cores CA and CB will change their states for each current input pulse and interlaced pulses will appear at the terminals Output A and B at a recurrence frequency equal to half that of the input current pulse frequency.

It will be appreciated no doubt that the two counters described with reference to FIGS. 2(*a*) and (*b*) can assume an intermediate position in which both cores CA and CB are in the same state. Once correct operation is initiated however by any convenient method the state of the cores CA and CB will continue to be asymmetrical, any subsequent disturbance of this asymmetry can then be recognised as a fault state. In certain applications, for example in digital computers, this feature may be particularly valuable.

A different counter which cannot assume an intermediate magnetic state is now described with reference to FIG. 3. A core CA is coupled to a transistor TA through a coil TOA and a core CB is coupled to a transistor TB through a coil TOB. The collector of the transistor TA is connected to a "0" coil wound on the core CB and the collector of the transistor TB is connected to a "1" coil wound on the core CA. An Input terminal is connected to a "0" coil wound on the core CA in series with a "1" coil wound on the core CB. A Reset terminal feeds a Reset "0" coil wound on the core CB. Appropriate collector supply voltages are fed as before through resistors RAA and RAB across which terminals Output A and B are connected.

In operation, input pulses are applied to the Input terminal and reset pulses which are interlaced with the input pulses are applied to the Reset terminal. These pulses are shown in terms of relative ampere-turns applied to a core by the energising windings at (*a*) and (*b*) of FIG. 4.

If the cores CA and CB are assumed initially to be in the "0" state then the first reset pulse causes no change in the state of the core CB but the succeeding input pulse although not affecting the core CA reverses the magnetisation of the core CB into the "1" state (see FIGS. 4(*c*) and (*d*)). Because the core CB is changed from the "0" to the "1" state the transistor TB is not operated; the next reset pulse however changes the core CB back to the "0" state. This change causes an induced E.M.F. in the coil TOB and the transistor TB is operated. In operating the transistor TB changes over the core CA from its "0" state to the "1" state by virtue of its collector current which flows in the "1" coil on the core CA. Here again the change from the state "0" to the state "1" of the core CA is ineffective; the transistor TA which is coupled to the core through the winding TOA does not therefore operate.

The next input pulse changes over the state of the core CA from "1" to "0" by means of the "0" coil on the core CA and the same input pulse current flowing in the "1" coil associated with the core CB attempts to change over the core CB from its "0" state. The change-over of the core CA however operates the transistor TA to energise the "0" coil on the core CB. This "0" coil thus acts as an inhibit coil and prevents the change-over of the core CB. The states of the cores CA and CB during this sequence of operations can be clearly seen at (*c*) and (*d*) in FIG. 4.

The cores CA and CB are now both in the "0" state which they occupied when the sequence of operations began. Susequent operation of the circuit therefore follows as before. During operation of the circuit pulse outputs are present at the Outputs A and B and are of a recurrence frequency equal to half that of the input pulses.

If the operation of the circuit is considered in detail it will be seen that the pulse in the collector circuit of the transistor TA, which inhibits through the "0" coil of the core CB the action of the second input pulse in the "1" coil of the core CB, is delayed relative to the input pulse due to the finite time the ferrite core takes to change its state (e.g. half a microsecond) and to the time taken by the transistor TA to operate fully (say as long as 2 microseconds). Ideally of course the inhibit pulse from the transistor TA should overlap the beginning and end of the input pulse.

In actual practice however the flux in the core CB changes as shown by the dotted line SP at (*d*) FIG. 4, and the subsequent reset pulse K causes the transistor TB to turn on a small amount of current thus giving an unwanted spurious pulse L ((*f*) of FIG. 4) in the collector circuit of the transistor TB. This small pulse L can change the flux in the core CA as indicated at M ((*c*) of FIG. 4) with the result that a further spurious pulse can occur in the collector circuit of the transistor TA; this further spurious pulse is shown at M ((*e*) of FIG. 4).

The reliability of the counter depends on keeping the small spurious pulses L and M well below the levels at which they could cause unwanted change of magnetisation of the cores CA and CB. Care is therefore taken to keep the amplitude and duration of these unwanted pulses small relative to the amplitudes and durations which would be necessary to change over the states of the cores CA and CB.

Where it is desirable to make the ratio of wanted to unwanted spurious pulses to be as high as possible a condenser C, shown dotted in FIG. 3, can be added across the "1" coil of the core CB. The action of this condenser C is to slow the rise of the input pulse which tries to change over the magnetisation of the core CB so that the pulse coming from the transistor TA to inhibit this action through energisation of the "0" coil of the core CB can overtake the input pulse before any significant change of flux has occurred in the core CB.

A chain of six such counters was formed and the reliability of the second counter of the chain was investigated as a function of the value of the condenser C. The results are shown in FIGS. 5 and 6. In the chain of counters the arrangement was such that the transistor TA of each counter was used to drive the following counter stage and consequently the design was made to enhance the ratio of wanted to spurious output signals in the case of the transistor TA. FIG. 6 shows the amplitudes of the wanted and unwanted spurious signals as a function of the value of the condenser C; also shown for comparison purposes are the core conditions in terms of ampere turns for the "corner" of the rectangular hysteresis loop and for the minimum switch-over magnetisation field of a core. It is interesting to note also that the supply voltage for the six stage counter could be varied by as much as ±25% before the counter chain ceased to function. The values of the resistors RAA and RAB were not critical; the collector current during operation of the transistor was of the order of 50 milliamps. and the variation due to normal temperature changes which can occur in the collector current of a transistor had little effect on the operation of the counter.

It was found that, in the case of a counter of the type shown in FIG. 3, if the turns in the "0" (inhibit) coil of the core CB were increased and the series resistor RAB were increased so as to keep the number of ampere-turns the same, the rate of rise of the inhibiting current of the "0" coil increased (due to the characteristic of the transistor TA); transistors have the property of being able to operate more quickly at low current loads than at higher current loads. At the same time the duration of the current pulse from the transistor TA was increased due to the effect of hole storage in the transistor TA. This expedient could be adopted instead of inserting the condenser C but there may be practical difficulties such as in winding more turns on the core CB.

A modification of the circuit described with reference to FIG. 3 is one in which the "1" coil of the core CB and the "0" (inhibit) coil are one and the same coil the collector and emitter of the transistor TA being connected across the one coil in parallel with the connections from the input circuit. This has the advantage of using one less coil but gives only one output. For some applications this may of course be acceptable.

Counters of the type shown in FIG. 3 can be connected in cascade to produce multi-stage counters. Three stages of such a counter are shown in FIG. 7 where each succeeding stage is driven at its input terminal from the transistor TA of the previous stage. To enable the component counters of the multi-stage counters to be recognised the designations of FIG. 3 are adopted throughout with the addition of suffixes 1, 2, or 3 to denote the stage of the counter to which a component belongs. For the sake of brevity the detailed operation of the counter will not be described here; it follows directly from the operation of the counter of FIG. 3 described above. It should perhaps be noted however that some economy of resistors is possible because the different collectors take current at different times.

The binary counters described only consume power during magnetic transitions and any particular stage consumes half the power of the previous stage. The power consumption of a counter dividing from 1600 c./s. to 25 c./s. in six stages is of the order of 15 milliwatts.

The basic circuit of FIG. 1(*a*) can be elaborated and used to provide a useful and economical P-pulse generator. A P-pulse generator is used for example in digital computing apparatus for providing a number of separate pulse outputs of the same pulse recurrence frequency but in which the pulses are uniformly distributed in phase over a given interval. FIG. 8 shows the circuit of such a generator together with some waveforms useful in understanding its operation.

A number, say 47, of cores C1, C2 . . . C47 are connected in basic circuit elements of FIG. 1(*a*) and are linked to input "1" coils of succeeding cores by the connection of these "1" coils in the collector-emitter circuits of the transistors TA1, 2, 3 . . . 47 of the circuit elements. "0" coils on the odd numbered cores C1, C3 . . . C47 are connected in series to an XX′ line and "0" coils on the even numbered cores C2, C4 . . . C46 are connected in series to a YY′ line; the collector circuits of the transistors TA1, 2 . . . 46 are connected to a common lead which feeds to a negative source via the emitter-collector circuit of a transistor TZ and the "1" coil of a core CBS. The function of the transistor TZ and the core CBS will be described later and need not be considered closely at this stage. The collector of the transistor TA47 is connected separately to a point (earth) negative relative to its emitter.

In a computer clock pulses, and X, Y and Z pulses as shown, are generally available. It will be seen that the X and Y pulses are interlaced and coincident with alternate clock pulses; the Z pulses which are of the same recurrence frequency as the clock pulses are interlaced with them. Now, if the core C1 is taken to be in the "1" state and the cores C2–C47 are in the "0" state, the occurrence of Y pulses will not affect the even cores C2, C4 . . . C46 neither will X pulses affect the cores C3–C47; but the first X pulse will change the state of the core C1 through the "0" coil on the core C1. When this happens the coil TO1 has an E.M.F. induced in it of a direction such that the transistor TA1 operates to energise the "1" coil on the core C2; the core C2 being in the "0" state promptly changes over to the "1" state. For a change in this sense, i.e. from the "0" state to the "1" state no operation of the succeeding transistor TA2 can take place.

The next Y pulse in the "0" coils of the cores changes the state of the core C2 to the "0" state from the "1" state and the coil TO2 is energised. The energisation of the coil TO2 in this way means that the transistor TA2 operates to energise the "1" coil wound on the next core C3 to put the core C3 in the "1" state. The next X pulse thereupon changes the "1" state of the core C3 when it energises the "0" coil of the core C3; accordingly the coil TO3 is energised in the correct sense to operate the associated transistor TA3; this changes the state of the succeeding core C4 from the "0" to the "1" state by energising the "1" coil of the core C4. The next Y pulse then changes back the state of the core C4 and the process carries on with the alternate X and Y pulses operating on the odd and even cores respectively to reverse the "1" state established by the preceding transistor so that, eventually, the core C47 changes from a "1" to a "0" state, energising the coil TO47 to operate the transistor TA47.

It will thus be seen that a "1" condition injected into the chain of cores C1 . . . C47 is passed step by step down the cores and as a "1" state passes from one core to the next an output appears at the appropriate one of the output terminals 1, 2, 3 . . . 47; these output pulses are at $1/47$ of the clock pulse recurrence frequency and are uniformly separated in phase.

In a circuit of this type for correct operation it is necessary to ensure that the cores C1 to C47 are in the "0" state before a "1" state is injected to the core C1. Accordingly a circuit, comprising two cores CAS and CBS with associated transistors TAS and TBS, is provided to ensure the correct states of the cores C1 . . . C47 and to determine the correct instant for insertion of the "1" state into the core C1.

Clock pulses are applied to a "1" coil wound on the core CAS and Z pulses are applied to two "0" coils each wound on one of the cores CAS and CBS and connected in series on a ZZ′ line. A Z pulse ensures that the core CAS is in the "0" state so that the succeeding clock pulse changes the core from the "0" to the "1" state. Transistor TAS is not therefore operated via the coil TOAS when a clock pulse occurs. The succeeding Z pulse, however, will turn the core CAS from the "1" state to the "0" state and transistor TAS will operate by virtue of the induced E.M.F. in the coil TOAS.

The operation of transistor TAS can energise the "1" coil wound on the core C1; each time a "1" condition is passed down a step of the chain of cores C1 . . . C47, however, the transistor TZ in the common lead to the transistors TA1 to 47 operates and the "1" coil wound on the core CBS is energised so establishing the "1" state in the core CBS.

Thus, whilst there is a "1" state travelling along the chain of cores C1 . . . C47, a Z pulse in the ZZ′ line as it passes through the "0" coil of the core CBS will change the core from a "1" to a "0" state. This energises the coil TOBS so that the transistor TBS operates.

It can now be recalled that the same Z pulse which has changed the CBS coil from the "1" to the "0" state has also at the same time changed the core CAS from the "1" to the "0" state. So, although the transistor TAS will have operated, the "1" coil on the core C1 will not be energised because the transistor TBS has operated in shunt with it.

When however the "1" state which is passing down the cores C1 to C47 is driven off, so to speak, from the core C47 the operation of the transistor TA47 does not also cause the operation of the transistor TZ; the collector circuit of the transistor TA47 is not connected to the commence lead as the other transistor collectors are.

The shunting action of the transistor TBS does not therefore occur for the Z pulse coming after the core C47 has lost its "1" state. The transistor TAS can therefore energise the coil "1" of the core C1 in response to the Z pulse to inject a "1" into the chain of cores C1 . . . C47. This injected "1" state again travels down the cores C1 . . . C47 and the process can repeat itself indefinitely.

It can be shown that, whatever the starting conditions of the cores C1 . . . C47, after switching-on the cores C1 . . . C47 will clear themselves of unwanted "1" states and, when the last "1" state has left the core C47, a correctly-timed "1" state will be injected into the core C1. Moreover, any fault state resulting in an incorrectly conditioned core will be shown up as a spurious output on the terminals Output 1 to 47.

The circuit of a P-pulse generator of the type described above can be easily adapted to be a continuous-running, closed-loop circuit by connecting the output at the end of the chain of cores to energise the input of the chain. In such a case an even number of cores will be necessary—this can be seen from pictorial considerations—and a suitable modification will be required to the control circuit to ensure correct initial conditions.

Although the circuits have been described using N-type transistors it will readily be appreciated that P-type transistors can be used by appropriate changes of sign of circuit potentials and so forth.

The circuits are applicable to either junction or point-contact transistors; with point-contact transistors however a small auxiliary bias may be required in their base-emitter circuits. At high temperatures junction transistors may require the insertion of an auxiliary bias in the base-emitter circuits to reduce the standing current which although negligible at low temperatures may increase at high temperatures.

Standard sub-unit assemblies are possible for the basic sub-circuits of FIG. 1 to assist their assembly into larger circuit units such as those which have been described. Such sub-units are very suitable for use with printed circuit techniques. One sub-unit conveniently comprises a transistor, a wound core and a resistor, all assembled in a small shell-like plastic casing.

Typical wound cores were 2 x 2 mm. diameter rings of Mullard D2 ferrite with three coils having 25, 25, 40 turns or four coils having 25, 25, 25, 40 turns of 0.0015″ dia. enamel wire wound on them.

Transistors which were used were those known as Mullard OC71 and OC72.

Typical values of the load resistor RA and the negative source of the circuits of FIG. 1 are 150 ohms and 8 volts respectively.

We claim:

1. A binary counter comprising at least first and second storage and switching circuits, each circuit comprising a magnetic circuit means having a rectangular hysteresis-loop characteristic, a first and a second coil coupled to each of said magnetic circuit means, and a semiconductor device having an electron emitting electrode, an electron collecting electrode and a control electrode, said device having its control electrode-electron emitting electrode circuit connected to the first coil of said first magnetic circuit means and its electron collecting electrode circuit connected to the second coil of said second magnetic circuit means, a common input circuit means coupled to said first and second magnetic circuit means for periodically switching said first magnetic circuit means to a first magnetic state and said second magnetic circuit means to a second magnetic state and means coupled to said second magnetic circuit means for periodically switching said second magnetic circuit means to said first magnetic state, and means coupling said magnetic circuit means, said coils being wound to render said semiconductor device conductive when said first magnetic circuit means is switched to said first magnetic state and to switch said second magnetic circuit means into said first magnetic state.

2. A binary counter as claimed in claim 1, wherein the common input circuit comprises first and second input coils connected together, the first being coupled with the magnetic circuit of the first storage and switching circuit and the second with the magnetic circuit of the second storage and switching circuit.

3. A binary counter as claimed in claim 2, wherein there is provided means associated with the second input coil for slowing the rise of current in it and hence the rise in energisation of the second magnetic circuit by the second input coil.

4. A binary counter as claimed in claim 1, wherein the common input circuit comprises an input coil coupled with the magnetic circuit of the first storage and switching circuit and connected to the second coil of the second magnetic circuit.

5. A shift register comprising a plurality of binary counters as claimed in claim 1, the counters being connected in cascade output to input, and the further energising means connected for operation from a common source.

6. A shift register comprising a plurality of binary counters as claimed in claim 2, the counters being connected in cascade output to input, and the further energising means connected for operation from a common source.

7. A shift register comprising a plurality of binary counters as claimed in claim 3, the counters being connected in cascade output to input, and the further energising means connected for operation from a common source.

References Cited in the file of this patent

UNITED STATES PATENTS

| | | |
|---|---|---|
| 2,591,406 | Carter | Apr. 1, 1952 |
| 2,644,892 | Gehman | July 7, 1953 |
| 2,691,073 | Lowman | Oct. 5, 1954 |
| 2,710,928 | Whitney | June 14, 1955 |
| 2,866,178 | Lo | Dec. 23, 1958 |
| 2,902,609 | Ostroff | Sept. 1, 1959 |
| 2,911,626 | Jones | Nov. 3, 1959 |